(12) United States Patent
Haydon et al.

(10) Patent No.: US 10,144,338 B1
(45) Date of Patent: Dec. 4, 2018

(54) POSITIONING ASSEMBLY AND METHOD FOR VEHICLE COMPONENTS

(71) Applicant: Ford Global Technologies, LLC, Dearborn, MI (US)

(72) Inventors: Nicholas Haydon, Woodhaven, MI (US); Sarbjit Singh, Canton, MI (US); Dale Darkowski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/647,610

(22) Filed: Jul. 12, 2017

(51) Int. Cl.
*B60Q 1/04* (2006.01)
*F16B 45/04* (2006.01)
*B60R 19/18* (2006.01)

(52) U.S. Cl.
CPC .......... *B60Q 1/0441* (2013.01); *B60Q 1/045* (2013.01); *B60Q 1/0483* (2013.01); *B60R 2019/1886* (2013.01); *F16B 45/04* (2013.01)

(58) Field of Classification Search
CPC .... B60Q 1/0441; B60Q 1/045; B60Q 1/0483; B60R 2019/1886; F16B 45/04
See application file for complete search history.

(56) References Cited

U.S. PATENT DOCUMENTS 7,631,845 B2 12/2009 Shafer
2005/0190573 A1* 9/2005 Schwab ............... B60Q 1/0491
362/549

FOREIGN PATENT DOCUMENTS

| CN | 203780467 | 8/2014 |
| CN | 104015683 | 9/2014 |
| FR | 2959183 | 10/2011 |
| KR | 20150137287 | 12/2015 |

* cited by examiner

*Primary Examiner* — David V Bruce
(74) *Attorney, Agent, or Firm* — Carlson, Gaskey & Olds, P.C.

(57) ABSTRACT

An exemplary positioning assembly for a vehicle component includes a hook structure of a lamp assembly, and a flange of a fascia. The flange is received within a slot of the hook structure to position the fascia relative to the lamp assembly. An exemplary positioning method for a vehicle component includes holding a flange of a fascia within a slot of a hook structure. The holding positions a portion of the fascia relative to a lamp assembly that includes the hook structure.

18 Claims, 6 Drawing Sheets

POSITIONING ASSEMBLY AND METHOD FOR VEHICLE COMPONENTS

TECHNICAL FIELD

This disclosure relates generally to positioning vehicle components, such as a fascia and a lamp assembly, relative to each other. A hook structure can be utilized to control a gap between the lamp assembly and the fascia.

BACKGROUND

Vehicles include many types of lamp assemblies, such as head lamps and tail lamps. The lamp assemblies interface with many other types of components, such as fascias. Controlling the positioning of the lamp assemblies relative to the other components is desirable for aesthetic purposes.

The lamp assembly can be rigidly attached to surrounding components using a mechanical fastener. This method of attachment may, however, inhibit removing the lamp assembly for service. That is, a technician may need to remove the fascia so that the mechanical fastener can be accessed with a tool.

SUMMARY

A positioning assembly for a vehicle component, according to an exemplary aspect of the present disclosure, includes, among other things, a hook structure of a lamp assembly, and a flange of a fascia. The flange is received within a slot of the hook structure to position at least a portion of the fascia relative to the lamp assembly.

Another example of the foregoing assembly includes the hook structure at a vertical bottom portion of the lamp assembly.

Another example of any of the foregoing assemblies includes a first, a second, and a third section of the hook structure. The first section is vertically above the third section. The second section curves vertically downward to connect the first section to the third section.

Another example of any of the foregoing assemblies includes a rib of the hook structure. The rib extends from the first or the third section to the flange.

Another example of any of the foregoing assemblies includes the lamp assembly as a tail lamp of the vehicle.

Another example of any of the foregoing assemblies includes the flange contacting the hook structure to control a vertical distance between the fascia and the lamp assembly.

Another example of any of the foregoing assemblies includes a lens on a front side of the lamp assembly. The hook structure is disposed on a back side of the lamp assembly opposite the lens.

Another example of any of the foregoing assemblies includes the lens facing in a direction, and the slot of the hook structure opens in the direction.

Another example of any of the foregoing assemblies includes the lamp assembly having a first side facing outwardly away from the vehicle and an opposite, second side facing inwardly. The hook structure is disposed on the second side, Another example of any of the foregoing assemblies includes the hook structure being polymer based.

A positioning method for a vehicle, according to another exemplary aspect of the present disclosure, includes holding a flange of a fascia within a slot of a hook structure. The holding positions a portion of the fascia relative to a lamp assembly that includes the hook structure.

In another example of the foregoing method, the lamp assembly is removable from a vehicle without removing the fascia from the vehicle.

Another example of any of the foregoing methods includes rotating the lamp assembly relative to the fascia to withdrawn the flange from within the slot.

In another example of any of the foregoing methods, the lamp assembly includes a lens that is vertically above the hook structure.

In another example of any of the foregoing methods, the hook structure is at a vertical bottom portion of the lamp assembly.

In another example of any of the foregoing methods, the hook structure curves vertically downward from the lamp assembly.

In another example of any of the foregoing methods, the fascia includes a side facing outwardly away from a vehicle. The flange extends away from the first side.

In another example of any of the foregoing methods, the lamp assembly includes a first side facing outwardly away from the vehicle, and an opposite, second side facing inwardly. The hook structure is disposed on the second side.

In another example of any of the foregoing methods, the first side of the lamp assembly includes a lens.

In another example of any of the foregoing methods, the lamp assembly is a tail lamp of a vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
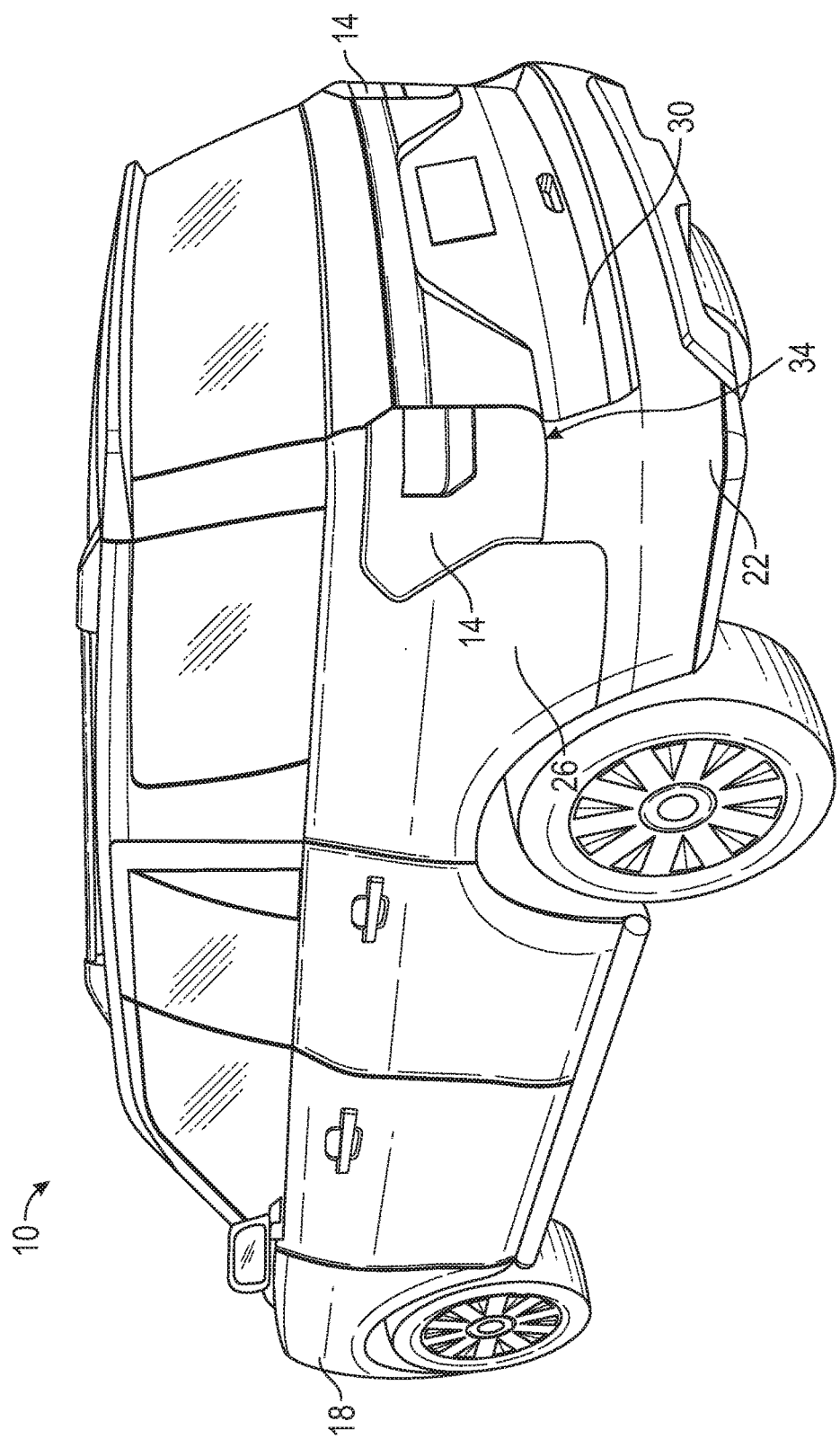
FIG. 1 illustrates a perspective view of a vehicle incorporating a positioning assembly according to an exemplary embodiment of the present disclosure.

This disclosure relates to positioning a lamp assembly of a vehicle relative to other vehicle components. Notably, the features used for the positioning permit removal of the lamp assembly for service without removing the other vehicle components.

Referring to FIGS. 1 to 4, an example vehicle 10 includes a pair of lamp assemblies 14 and a pair of lamp assemblies 18. The lamp assemblies 14 are tail lamps of the vehicle 10. The lamp assemblies 18 are head lamps of vehicle 10. The lamp assemblies 14 and 18 can be halogen lamps, for example.

A vertical bottom of each of the lamp assemblies 14 interfaces with a fascia 22. The lamp assemblies 14 additionally interface with a side panel 26 and a liftgate 30 of the vehicle 10.

The exemplary vehicle 10 incorporates positioning assemblies that control a positioning of vehicle components, such as a positioning of the lamp assembly 14 relative to the fascia 22. Notably, even with these positioning assemblies, the lamp assembly 14 can be removed from the vehicle 10 for service without requiring removal of the fascia 22. That is, the lamp assembly 14 can be moved from the position of FIG. 2 to the position of FIG. 3 without removing the fascia 22 from the vehicle 10.

Controlling the positioning of the lamp assembly 14 relative to the fascia 22 controls a size of a gap 34 between the lamp assembly 14 and the fascia 22. In some examples, the positioning assemblies of the vehicle control the gap 34 to be 1.5 millimeters+/−1.5 millimeters.

Although described in connection with one of the lamp assemblies 14, the positioning assemblies could be used in connection with other serviceable components, such as the head lamps.

Figure 2:
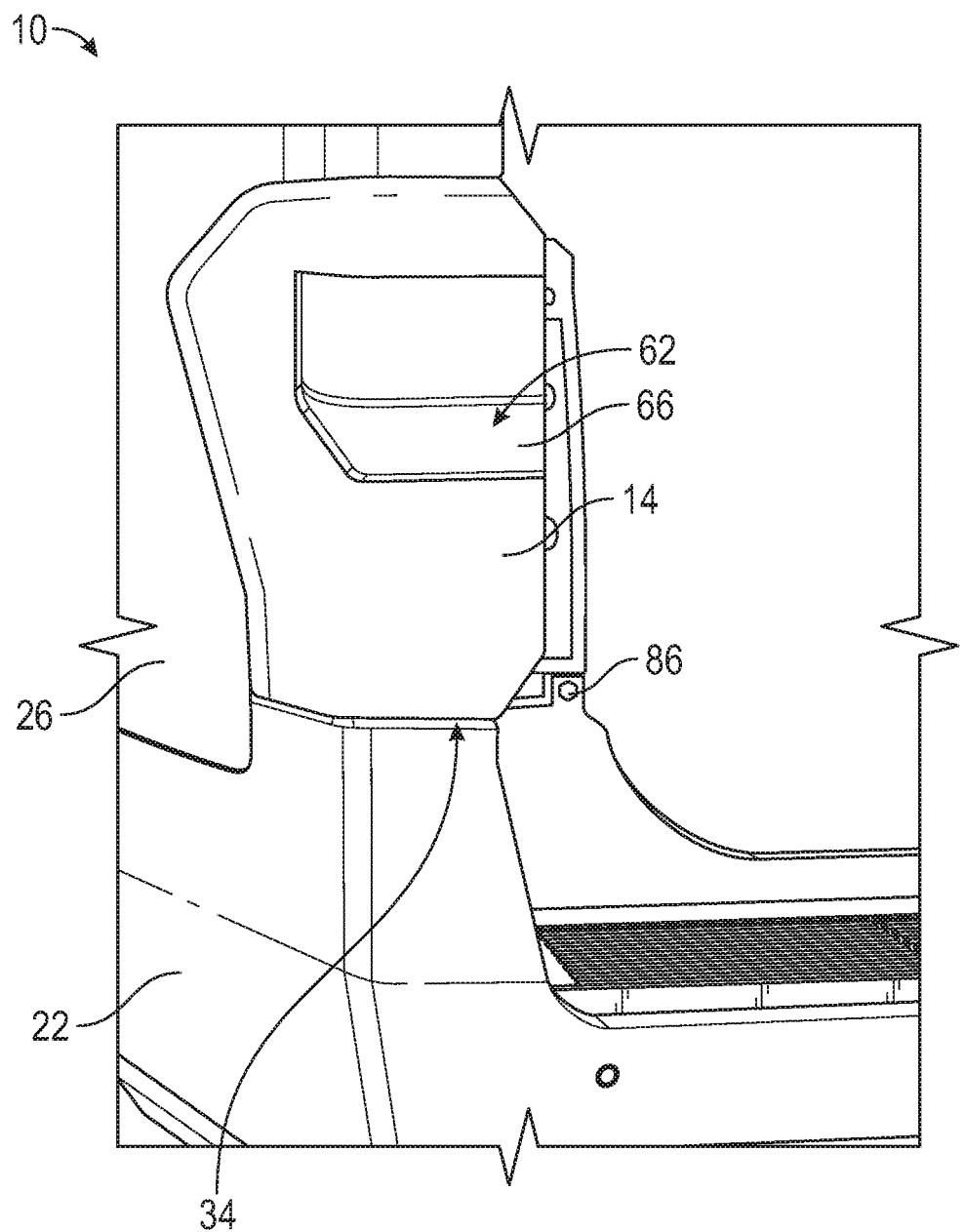
FIG. 2 illustrates a close-up view of a lamp assembly in an installed position within the vehicle of FIG. 1.
Figure 3:
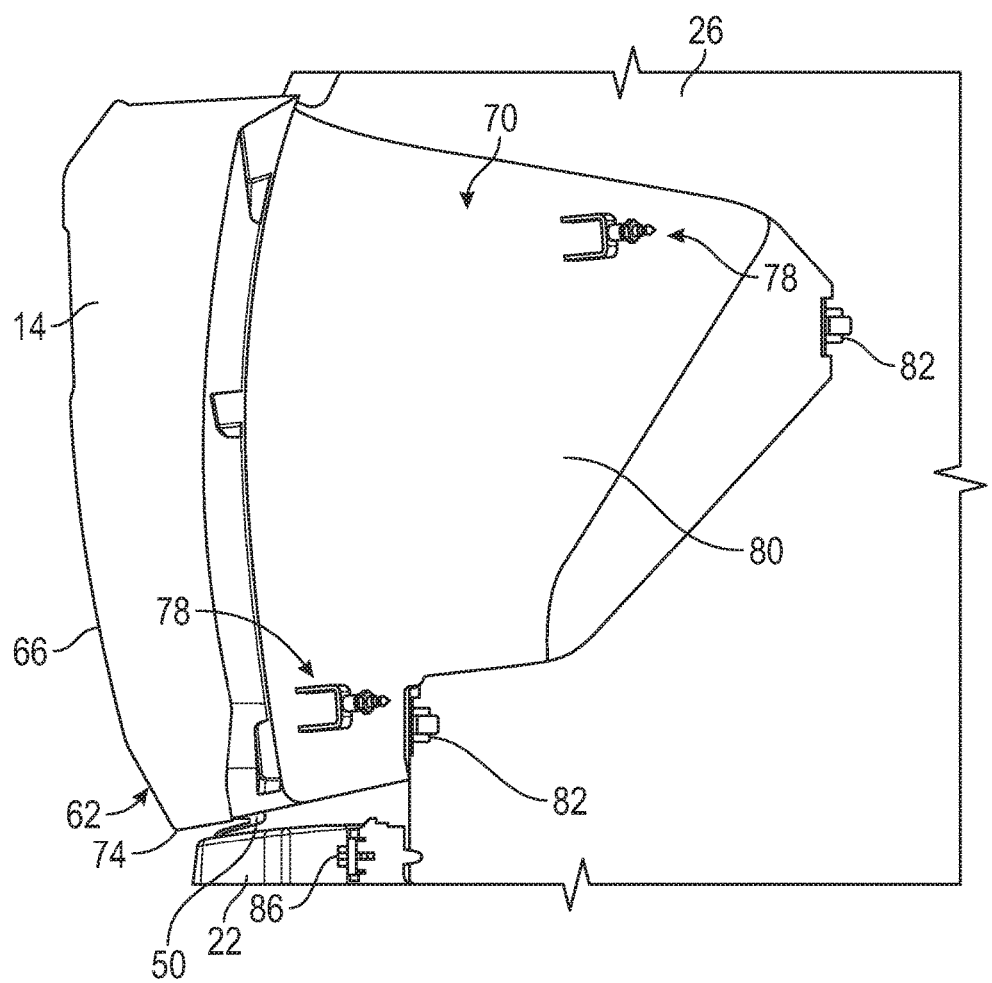
FIG. 3 illustrates a side view of the lamp assembly of FIG. 2 in an uninstalled position.
Figure 4:
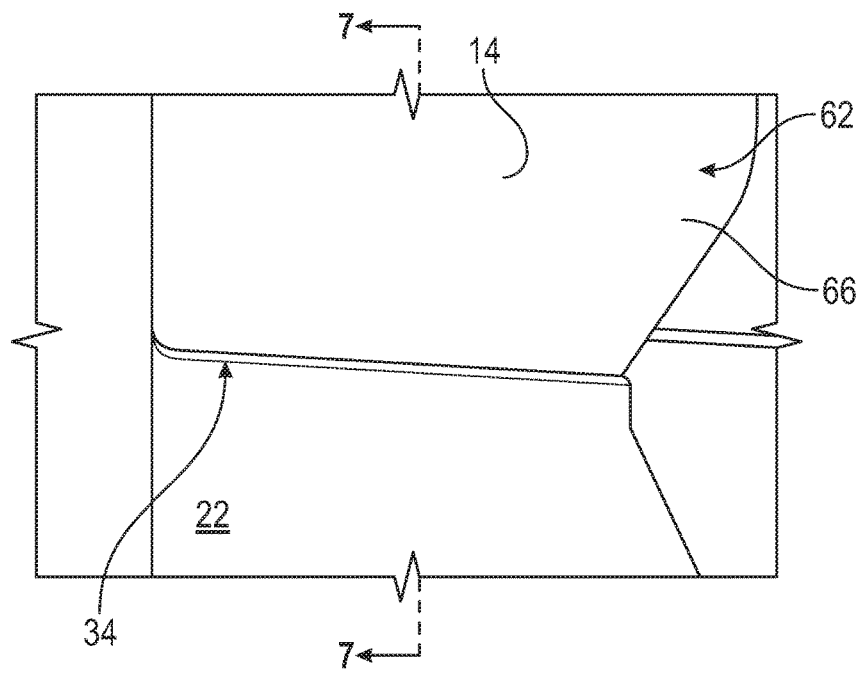
FIG. 4 illustrates a close-up view of the lamp assembly positioned relative to a fascia in the installed position.
Figure 5:
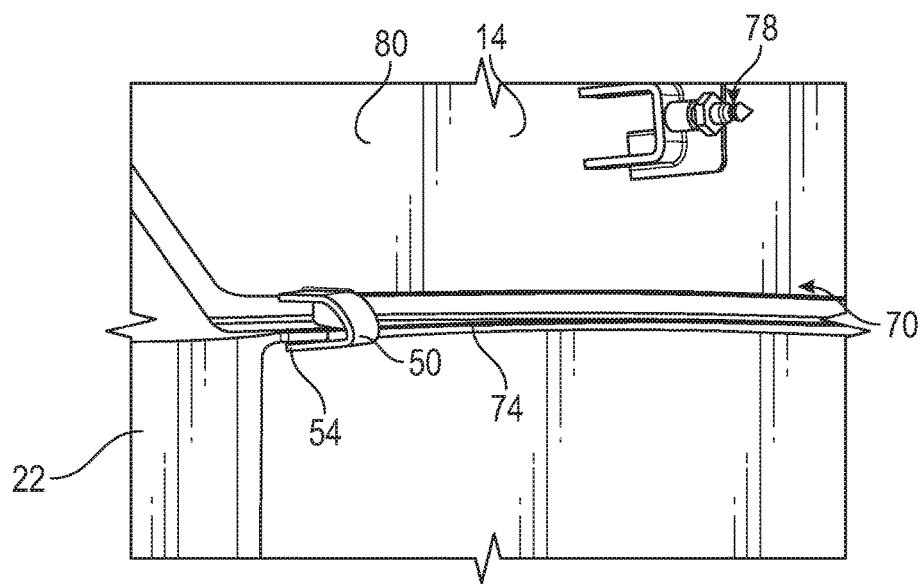
FIG. 5 illustrates an exemplary positioning assembly that positions the lamp assembly relative to the fascia.
Figure 6:
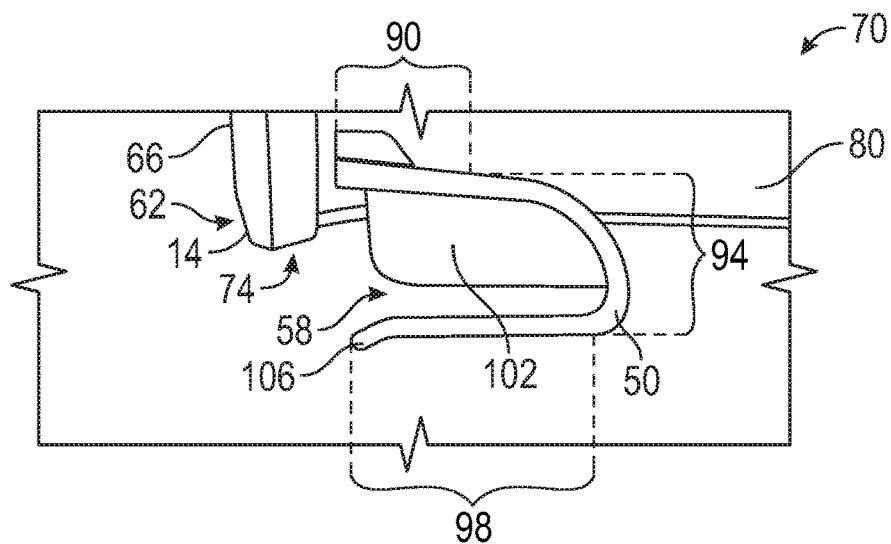
FIG. 6 illustrates a close-up perspective view of a hook structure of the positioning assembly of FIG. 4.

Referring now to FIGS. 5 and 6 with continuing reference to FIGS. 2 and 3, the positioning assemblies, according to an exemplary embodiment of the present disclosure, include a hook structure 50 and a flange 54. The hook structure 50 is part of the lamp assembly 14, and the flange 54 is part of the fascia 22. The hook structure 50 provides a slot 58 that receives the flange 54. Receipt of the flange 54 within the slot 58 holds the fascia 22 relative to the lamp assembly 14 to control a size of the gap 34. The holding positions at least a portion of the fascia 22 relative to the lamp assembly 14. The hook structure 50, for example, prevents the fascia 22 from sagging, which could increase the gap 34 or could result in the gap 34 having a noticeably inconsistent width.

Generally, the lamp assembly 14 includes a front side 62 that is visible when the lamp assembly 14 is installed. The front side 62 includes a lens 66. The lamp assembly 14 additionally includes a back side 70 that is substantially hidden when the lamp assembly 14 is installed. The front side 62 and the back side 70 face in opposite directions.

In this exemplary embodiment, the hook structure 50 extends from the back side 70 along a vertical bottom portion 74 of the lamp assembly 14. Vertical, for purposes of this disclosure, is with reference to the ground or horizon.

A plurality of attachment features 78 extend from a housing 80 on the back side 70 of the lamp assembly 14. The attachment features 78 engage corresponding attachment features 82 in the side panel 26, for example, to hold the lamp assembly 14 in installed position.

The attachment features 78 could be posts with enlarged heads, for example, and the attachment features 82 could be deformable receptacles. The enlarged heads of the attachment features 82 are pressed into the receptacles to deform the receptacles, which holds the lamp assembly 14.

In some examples, the housing 80 is a polymer-based material that is molded. Some or all of the attachment features 78 and the hook structure 50 are molded together with the housing 80 as a single monolithic structure.

The fascia 22 is a rear bumper in this example, and is also molded from a polymer-based material. The fascia 22 is secured in an installed position with, for example, mechanical fasteners 86. A person having skill in this art and the benefit of this disclosure would understand how to secure the fascia 22 to the remaining portions of the vehicle 10.

The fascia 22 includes a side facing outwardly away from the vehicle 10. The flange 54 extends away from that side.

When initially assembling the vehicle 10, the lamp assembly 14 is typically installed prior to the fascia 22. That is, the attachment features 78 can be pressed into the attachment features 82 without the fascia 22 being installed. After the lamp assembly 14 is secured, the flange 54 is pressed into the slot 58 and the mechanical fasteners 86 are torqued down to secure the fascia 22 in the installed position.

Figure 7:
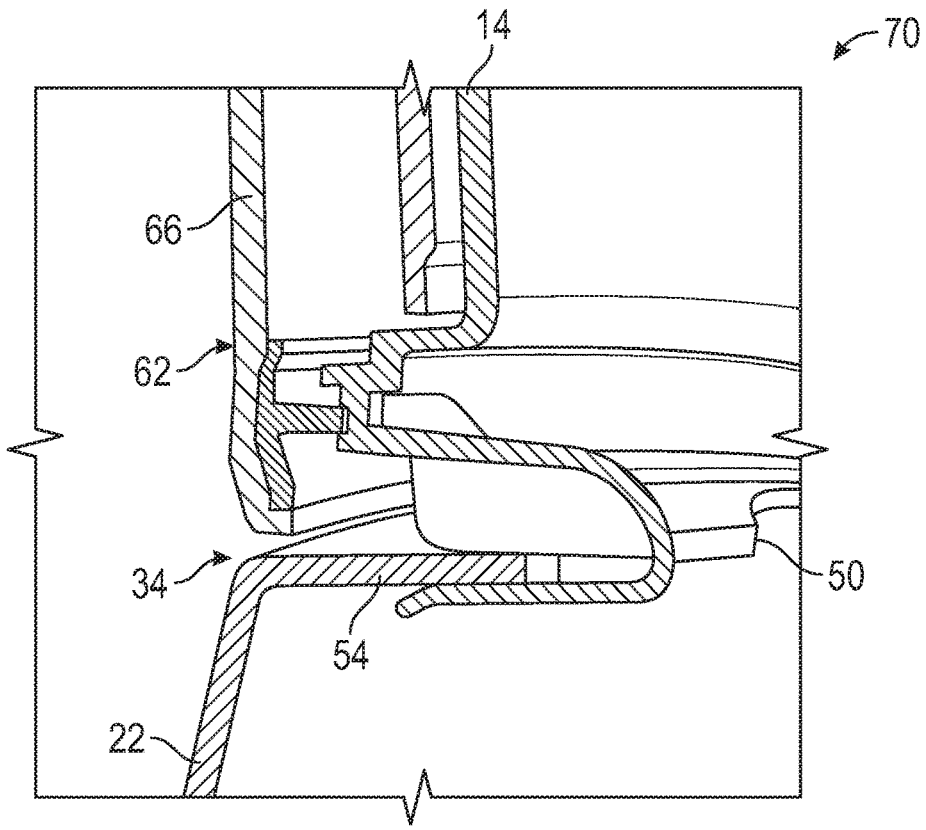
FIG. 7 illustrates a section view at line VII-VII in FIG. 4.
Figure 8:
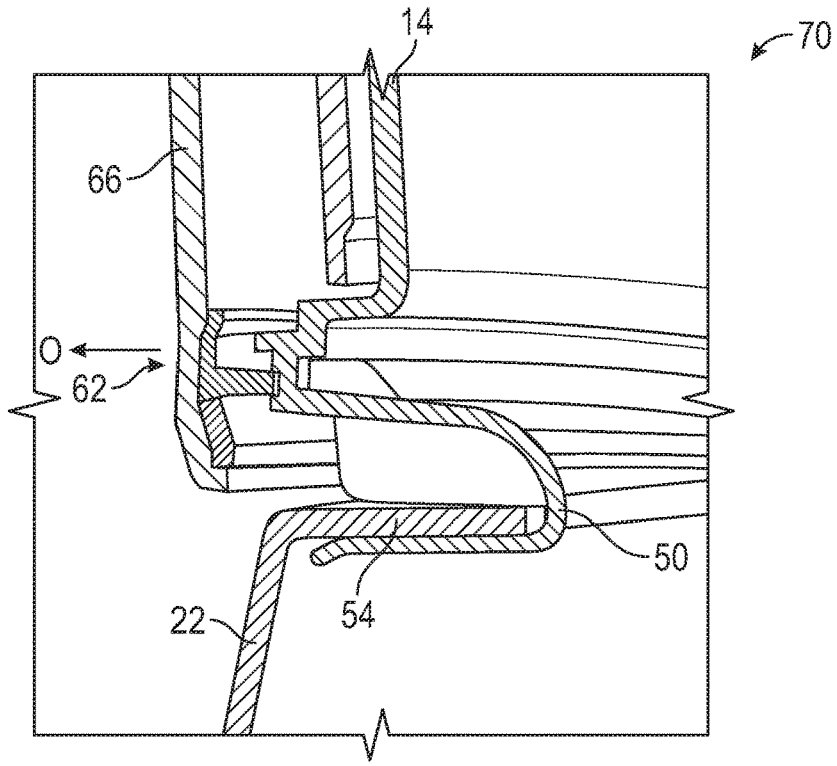
FIG. 8 illustrates the section view of FIG. 7 during an initial step of moving the lamp assembly to an uninstalled position where the lamp assembly can be serviced.
Figure 9:
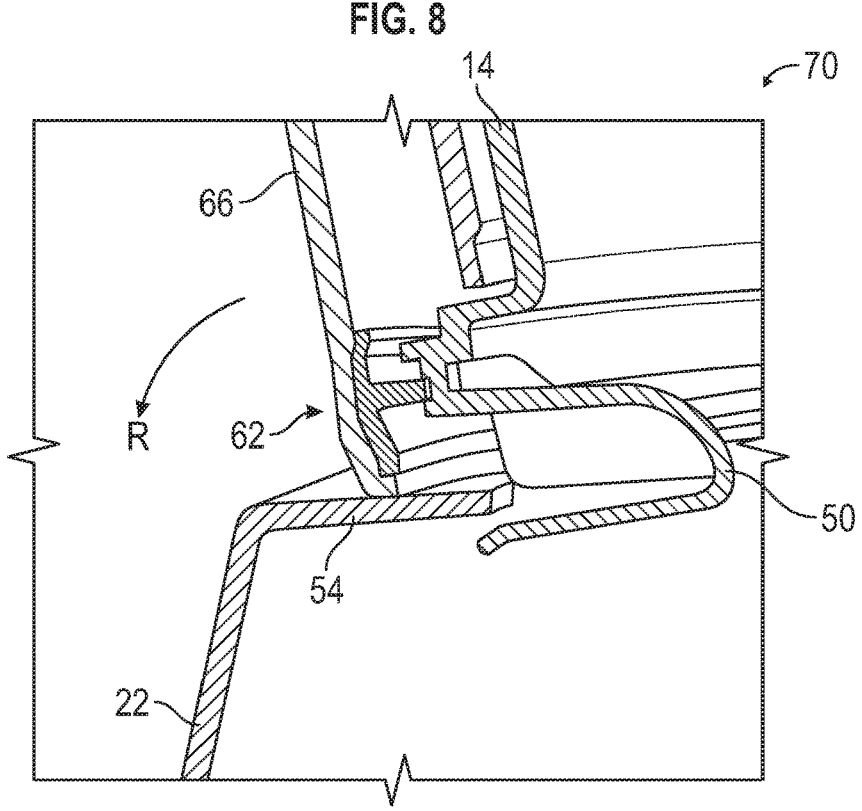
FIG. 9 illustrates the section view of FIG. 7 during a later step of moving the lamp assembly to the uninstalled position where the lamp assembly can be serviced.

After assembly, the lamp assembly 14 may require servicing, such as a bulb replacement, where the lamp assembly 14 needs to be uninstalled. FIGS. 7 to 9 shows the stages of movement of the positioning assembly to a disengaged position where the lamp assembly 14 can be uninstalled. First, the lamp assembly 14 is pulled outward from the position of FIG. 7 in a direction O. This outward movement forces the flange 54 deeper into the slot 58 to the position of FIG. 8. This outward movement also disengages the attachment features 78 from the attachment features 82 (see FIG. 3).

Next, the lamp assembly 14 is rocked or tilted downward in a direction R. This movement causes the vertical bottom portion 74 of the lamp assembly 14 with the hook structure 50 to move inward. The inward movement of the hook structure 50 moves the flange 54 from within the slot 58 to the position of FIG. 9. With the attachment features 78 disengaged, and the flange 54 outside the slot 58, the lamp assembly 14 can be moved away from the vehicle 10 and serviced.

Referring again to FIGS. 5 and 6, the hook structure 50 generally includes a first section 90, a second section 94, and a third section 98. The first section 90 is vertically above the third section 98. The second section 94 curves vertically downward to connect the first section 90 to the third section 98.

The exemplary hook structure 50 additionally includes a rib 102 that extends downwardly from the first section 90. In another example, the rib 102 extends upwardly from the third section 98. Alternatively, the rib 102 could include a first portion extending downwardly from the first section 90 and a second portion extending upwardly from the third section 98. When the flange 54 is positioned within the slot 58, the rib 102 contacts the flange 54.

The slot 58 of the hook structure 50 opens to the front side 62 of the lamp assembly 14. In this example, the hook structure 50 opens to the side of the lamp assembly 14 having the lens 66.

The third section 98, in this example, has a downwardly extending ramped portion 106. During initial assembly of the fascia 22, the ramped portion 106 helps to guide the flange 54 into the slot 58.

The lamp assembly 14 includes one hook structure 50. In other examples, the lamp assembly 14 could include more than one hook structure 50

Features of the disclosed examples include a positioning assembly that can be used to control a gap between a lamp assembly and a fascia without requiring separate bracket or other structures. Further, the positioning assembly permits the lamp assembly to be removed for service without removing the fascia.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A positioning assembly for a vehicle component, comprising:
   a hook structure of a lamp assembly, the hook structure having a first, a second, and a third section, the first section vertically above the third section, the second section curving vertically downward to connect the first section to the third section; and
   a flange of a fascia, the flange received within a slot of the hook structure to position at least a portion of the fascia relative to the lamp assembly.

2. The assembly of claim 1, wherein the hook structure is at a vertical bottom portion of the lamp assembly.

3. The assembly of claim 1, further comprising a rib of the hook structure, the rib extending from the first or the third section to the flange.

4. The assembly of claim 1, wherein the lamp assembly is a tail lamp of the vehicle.

5. The assembly of claim 1, wherein the flange contacts the hook structure to control a vertical distance between the fascia and the lamp assembly.

6. The assembly of claim 1, further comprising a lens on a front side of the lamp assembly, wherein the hook structure is disposed on a back side of the lamp assembly opposite the lens.

7. The assembly of claim 6, wherein the lens faces in a direction, and the slot of the hook structure opens in the direction.

8. The assembly of claim 1, wherein the lamp assembly has a first side facing outwardly away from the vehicle and an opposite, second side facing inwardly, the hook structure disposed on the second side.

9. The assembly of claim 1, wherein the hook structure is polymer based.

10. A positioning method for a vehicle, comprising:
    holding a flange of a fascia within a slot of a hook structure, the holding to position at least a portion of the fascia relative to a lamp assembly that includes the hook structure; and
    rotating the lamp assembly relative to the fascia to withdraw the flange from within the slot.

11. The method of claim 10, wherein the lamp assembly is removable from a vehicle without removing the fascia from the vehicle.

12. The method of claim 10, wherein the lamp assembly includes a lens that is vertically above the hook structure.

13. The method of claim 10, wherein the hook structure is at a vertical bottom portion of the lamp assembly.

14. A positioning method for a vehicle, comprising:
    holding a flange of a fascia within a slot of a hook structure, the holding to position at least a portion of the fascia relative to a lamp assembly that includes the hook structure, wherein the hook structure curves vertically downward from the lamp assembly.

15. The method of claim 10, wherein the fascia includes a side facing outwardly away from a vehicle, and the flange extends away from the first side.

16. The method of claim 10, wherein the lamp assembly includes a first side facing outwardly away from the vehicle, and an opposite, second side facing inwardly, the hook structure disposed on the second side.

17. The method of claim 16, wherein the first side of the lamp assembly includes a lens.

18. The method of claim 10, wherein the lamp assembly is a tail lamp of a vehicle.

* * * * *